(12) United States Patent
Rainish et al.

(10) Patent No.: US 6,782,250 B2
(45) Date of Patent: *Aug. 24, 2004

(54) BATTERY OPERATED RADIO RECEIVERS HAVING POWER SAVE BY REDUCING ACTIVE RECEPTION TIME

(75) Inventors: Doron Rainish, Ramat Gan (IL); Daniel Yellin, Ra'anana (IL); Paul Spencer, Bet Shemesh (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/449,131

(22) Filed: Jun. 2, 2003

(65) Prior Publication Data

US 2003/0194986 A1 Oct. 16, 2003

Related U.S. Application Data

(63) Continuation of application No. 09/371,276, filed on Aug. 10, 1999, now Pat. No. 6,606,490.

(51) Int. Cl.[7] .......................... H04B 1/16; H04B 7/212
(52) U.S. Cl. ................ 455/343.2; 455/574; 340/10.34; 370/347
(58) Field of Search .......................... 455/343.2, 343.5, 455/574, 127.1, 127.2, 127.5, 135, 343.1; 340/7.31, 7.32, 7.34, 525.2, 10.34; 370/347, 311, 330, 318, 324, 458, 459, 468

(56) References Cited

U.S. PATENT DOCUMENTS

| | | |
|---|---|---|
| 4,839,639 A | 6/1989 | Sato et al. |
| 5,152,006 A | 9/1992 | Klaus |
| 5,241,542 A | 8/1993 | Natarajan et al. |
| 5,252,963 A | 10/1993 | Snowden et al. |
| 5,265,270 A | 11/1993 | Stengel et al. |
| 5,361,276 A | 11/1994 | Submaranian |
| 5,392,287 A | 2/1995 | Tiedemann et al. |
| 5,448,774 A | 9/1995 | Yokozaki et al. |
| 5,471,655 A | 11/1995 | Kivari |
| 5,535,207 A | 7/1996 | Dupont |
| 5,551,078 A | 8/1996 | Connell et al. |
| 5,561,848 A | 10/1996 | Minami |
| 5,627,882 A | 5/1997 | Chien et al. |
| 5,629,940 A | 5/1997 | Gaskill |
| 5,678,227 A | 10/1997 | Connell et al. |
| 5,708,971 A | 1/1998 | Dent |
| 5,737,322 A | 4/1998 | Burbidge et al. |
| 5,740,517 A | 4/1998 | Aoshima |
| 5,754,583 A | 5/1998 | Eberhardt et al. |
| 5,822,689 A | 10/1998 | Hwang |
| 5,831,544 A | 11/1998 | Park |
| 6,088,576 A | 7/2000 | Sone |
| 6,108,324 A | 8/2000 | Brown et al. |
| 6,111,865 A | 8/2000 | Butler et al. |
| 6,125,137 A | 9/2000 | Wang et al. |
| 6,134,440 A | 10/2000 | Black |
| 6,208,837 B1 | 3/2001 | Koh et al. |
| 6,223,047 B1 | 4/2001 | Ericsson |
| 2001/0028674 A1 | 10/2001 | Edlis et al. |
| 2002/0126737 A1 | 9/2002 | Edlis et al. |

FOREIGN PATENT DOCUMENTS

WO    WO 98/44670    10/1998

Primary Examiner—Charles Appiah
(74) Attorney, Agent, or Firm—Eitan, Pearl, Latzer & Cohen, Zedek, LLP

(57) ABSTRACT

A portable radio receiver and a method of operating the radio receiver during Standby Mode is provided. The method comprises deactivating at least part of a receive path of a receiver until the start of a data-detection time interval in a frame in the event that estimated values of predetermined characteristics of a signal received by the receiver during the frame are within corresponding thresholds. The predetermined characteristics are affected by pre-conditioning functions performed on the receiver prior to the start of the data-detection time interval.

13 Claims, 6 Drawing Sheets

BATTERY OPERATED RADIO RECEIVERS HAVING POWER SAVE BY REDUCING ACTIVE RECEPTION TIME

CROSS-REFERENCE TO RELATED APPLICATIONS

This application is a continuation application of U.S. patent application Ser. No. 09/371,276, filed Aug. 10, 1999 now U.S. Pat. No. 6,606,490.

BACKGROUND OF THE INVENTION

Communication systems between a remote (base) station, and a mobile station or terminal, such as cellular phones and pagers, commonly include a current-saving mode, usually called an Idle or Standby mode, in order to save battery power in the mobile terminals. In these terminals, the Standby mode consists of a relatively long "sleep" interval in which most of the terminal blocks of the mobile station are deactivated, and a relatively short "reception" interval in which the terminal is enabled to receive from the base station transmitted data, usually a paging or a broadcast message, which may be intended for the terminal. The mobile station checks whether this message is intended for itself, and according to its contents, decides on further actions, like going to the sleep phase, continuing the reception phase, etc. Prior to the data detection in the reception phase, there is a pre-conditioning or synchronization period in which the receiver pre-conditions the receive path for data detection, e.g., synchronizes to the correct gain, frequency, DC offset, timing, and/or to other parameters the receiver may need. Examples for such parameters are equalizer tap gains when an equalizer is employed, or "fingers" gains and delays when a "RAKE" receiver is employed.

In the present systems of the foregoing type, the batteries provided in the receivers are generally capable of operating the receiver for a total Standby time of approximately 200 hours, and a total Talk time of approximately 2 hours before battery-recharging is required. It would be very desirable to increase this Standby time by decreasing the current drawings on the battery during this time.

Various techniques have been developed for reducing current drain in battery-operated receivers, as described, for example, in U.S. Pat. Nos. 5,708,971 and 5,737,322, but there is still a need to further decrease current drain particularly during the long "Standby" period.

BRIEF DESCRIPTION OF THE DRAWINGS

The present invention will be understood and appreciated more fully from the following detailed description taken in conjunction with the drawings in which.

DETAILED DESCRIPTION OF EMOBIDMENTS OF THE PRESENT INVENTION

Figure 1:
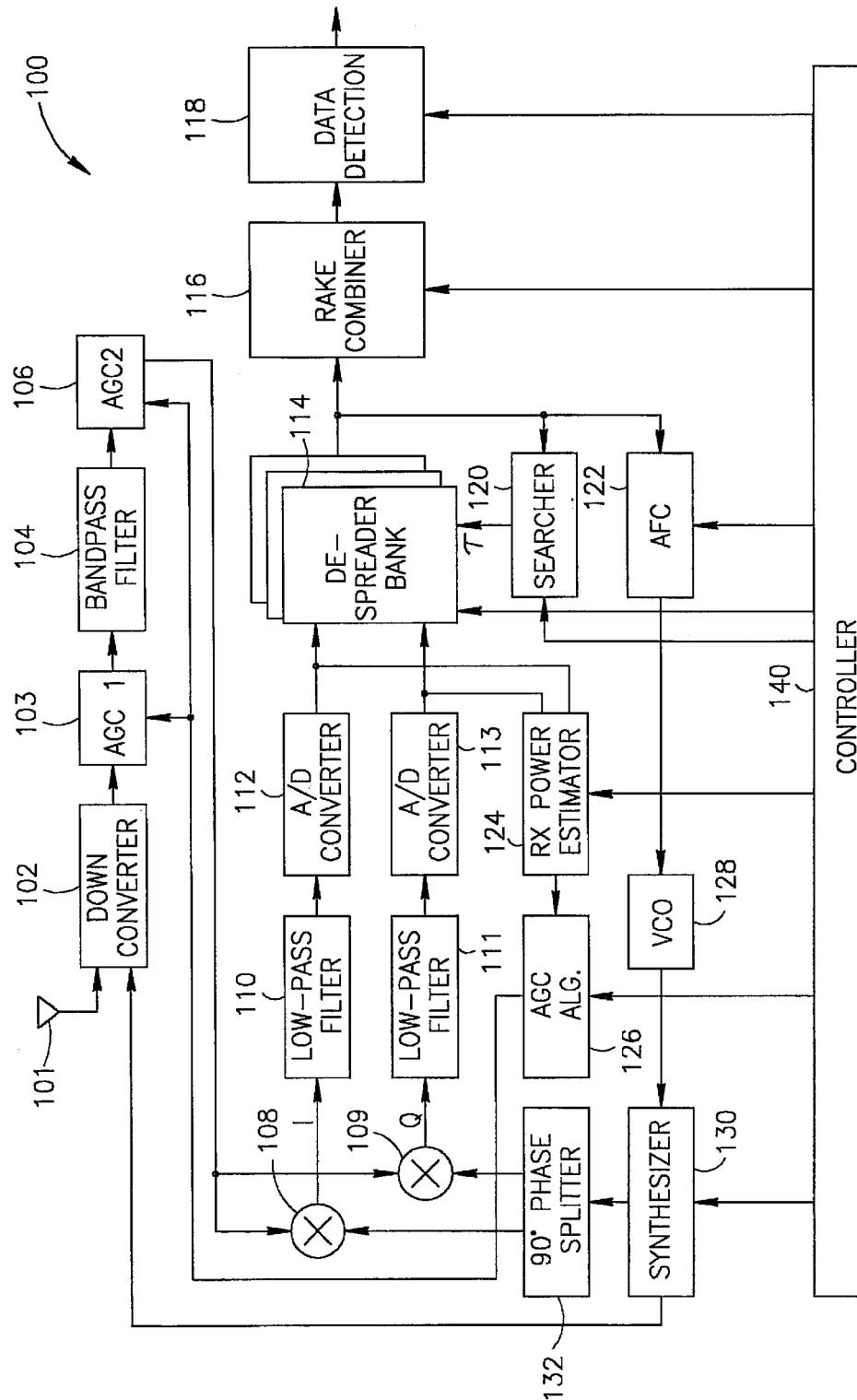
FIG. 1 is a schematic illustration of a prior art CDMA mobile station receiver.

FIG. 1 is a schematic. block diagram of a typical mobile station direct sequence (CDMA) receiver 100 in accordance with the prior art. RF signals are received by an antenna 101, filtered, amplified and downconverted to an intermediate frequency (IF) by a downconverter 102, amplified by a first automatic gain control (AGC) circuit 103, filtered by a bandpass filter 104, typically a surface acoustic wave (SAW) filter, to eliminate signals outside the required bandwidth, and amplified by a second automatic gain control (AGC) circuit 106.

The amplified IF signals are multiplied by two IF sinusoidal signals generated by a synthesizer 130, and shifted by 90° relative to each other by a phase splitter 132, to produce an in-phase signal I and a quadrature signal Q. The in-phase signal I is multiplied by a mixer 108, filtered by a low-pass filter 110 and digitized by an A/D converter 112. Similarly, the quadrature signal Q is multiplied by a mixer 109, filtered by a low-pass filter 111 and digitized by an A/D converter 113. An AGC 126 is coupled to a power estimator 124 and to the first and second AGC circuits.

A searcher 120 performs the correlations needed to determine the various multipath delays $\tau$ inside the target window. The digitized signals are correlated, at the delays determined by searcher 120, by the correlators of a de-spreader bank 114, whose outputs are transferred to the searcher 120. The outputs of de-spreader bank 114 are combined, in a maximal ratio sense, in a rake combiner 116 and fed to the data detection unit 118 that performs de-interleaving and FEC decoding to produce the final output signal.

The automatic frequency control unit 122 processes the de-spreader bank output to determine the control voltage to be fed to a voltage controlled oscillator 128 (usually a voltage controlled crystal oscillator) which supplies a corrected frequency to the synthesizer unit 130. The synthesizer unit 130 generates the frequencies required to the phase splitter 132 and to the down converter 102 so the required frequency will be received. The controller unit 140 supplies working parameters and timing signal to the units.

Although a quadrature receiver is shown, other receiver types, such as those using IF sampling and other samplings, can be employed.

Figure 2:
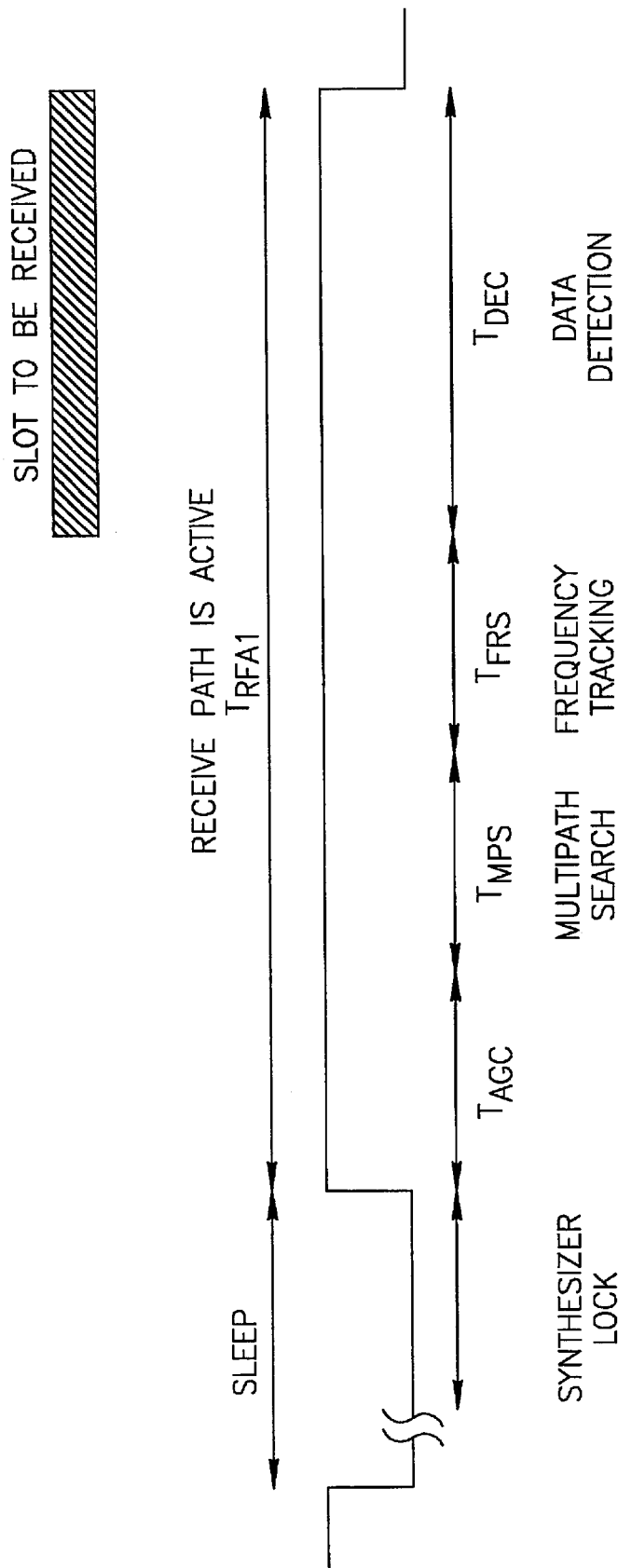
FIG. 2 is a timing diagram of the Standby period in the prior art receiver of FIG. 1.

FIG. 2 shows an example of reception timing during the Standby mode. The entire receive path of the radio is activated for time $T_{rfa1}=T_{AGC}+T_{mps}+T_{frs}+T_{dec}$ where: $T_{AGC}$ is the time required for the AGC to settle; $T_{mps}$ is the time required for the multipath search (fingers positioning); $T_{frs}$ is the time required for the frequency tracking; and $T_{dec}$ is the time require for data detection. Usually, $T_{AGC}$, $T_{mps}$ and $T_{frs}$ are designed to be long enough to cope with the worst case situation (i.e., bad channel conditions, large channel gain fluctuations, and/or wide multipath spread) since channel conditions and multipath spread are usually not known in advance when long sleep periods are used. Consequently, $T_{mps}$ may reach durations of ~4–5 ms, and $T_{frs}$ may reach duration of 1–2 ms, resulting in $T_{rfa1}$ which may be very long relative to $T_{dec}$. For example, $T_{dec}$ may be in the order of 60 µsecs but whereas $T_{rfa1}$ according to the prior art, may reach 5–7 mSecs Some prior art methods may perform multipath search in parallel to frequency tracking but they still have a long $T_{rfa1}$ relative to $T_{dec}$.

The present invention overcomes the disadvantages of the prior art, by providing a novel method which reduces the wake-up time of the radio section as well as the baseband section.

The present invention is particularly efficient for IS-95 CDMA idle applications, and is therefore described below with respect to such an application.

Figure 3:
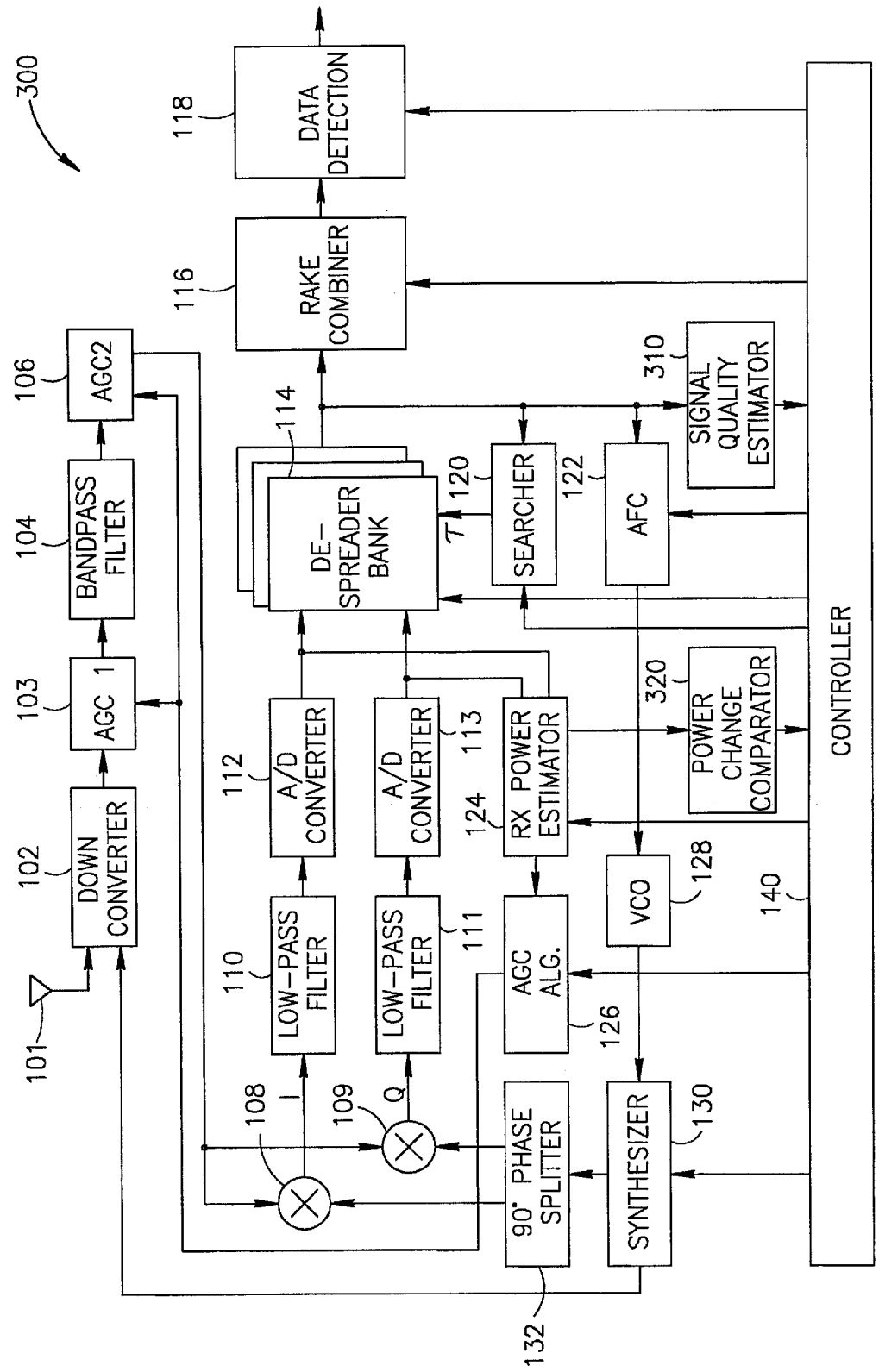
FIG. 3 is a schematic illustration of a CDMA mobile station receiver constructed according to the present invention.

FIG. 3 is a schematic block diagram of a CDMA mobile station receiver 300 constructed in accordance with the present invention. A signal quality estimator 310 is added between the de-spreader bank 114 outputs and the controller 140. A receive power comparator 320 is added between the received power estimator 124 and the controller 140. Otherwise the receiver of FIG. 3 is basically of the same prior art construction as illustrated in FIG. 1, and therefore its parts are identified by the same reference numerals to facilitate understanding.

Figure 4:
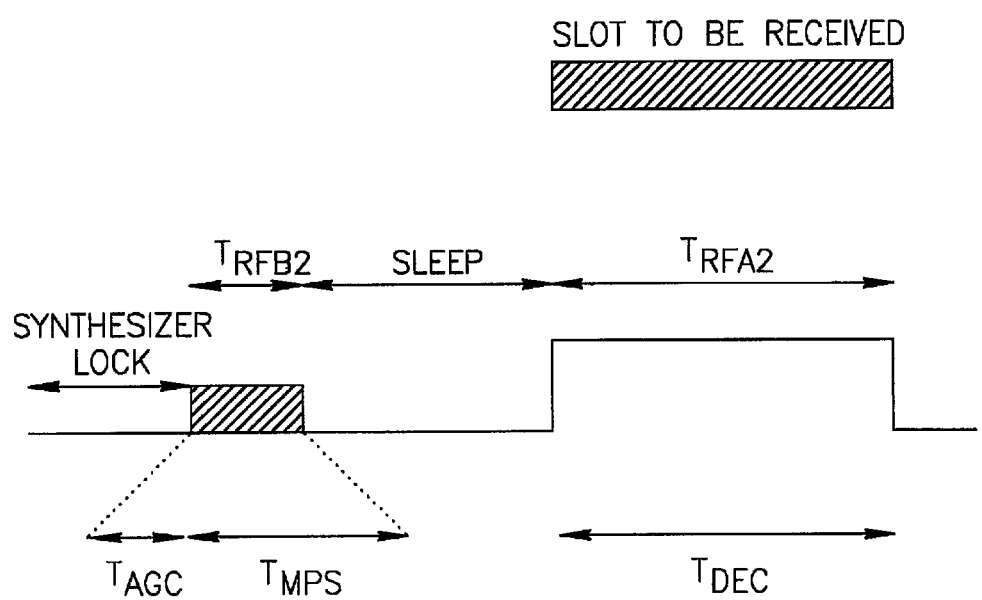
FIG. 4 is a timing diagram of the Standby period in the described embodiments of the present invention.

FIG. 4 is a timing diagram of the FIG. 3 receiver. In FIG. 4 $T_{rfb2}$ is moved to be prior to $T_{rfa2}$. During the period $T_{rfb2}$, a very short verification of the AGC level ($T_{AGC}$) and the received signal timings ($T_{mps}$, fingers positions) takes place. Since in the vast majority of the times, the AGC level and the fingers positions do not vary, or vary very little from their values measured at the previous slot (a few seconds before), $T_{rfb2}$ takes a very short time (less than ~1 ms for IS-95 applications). Frequency tracking ($T_{frs}$) is done during $T_{rfa2}$ in parallel to data decoding ($T_{dec}$).

Figure 5:
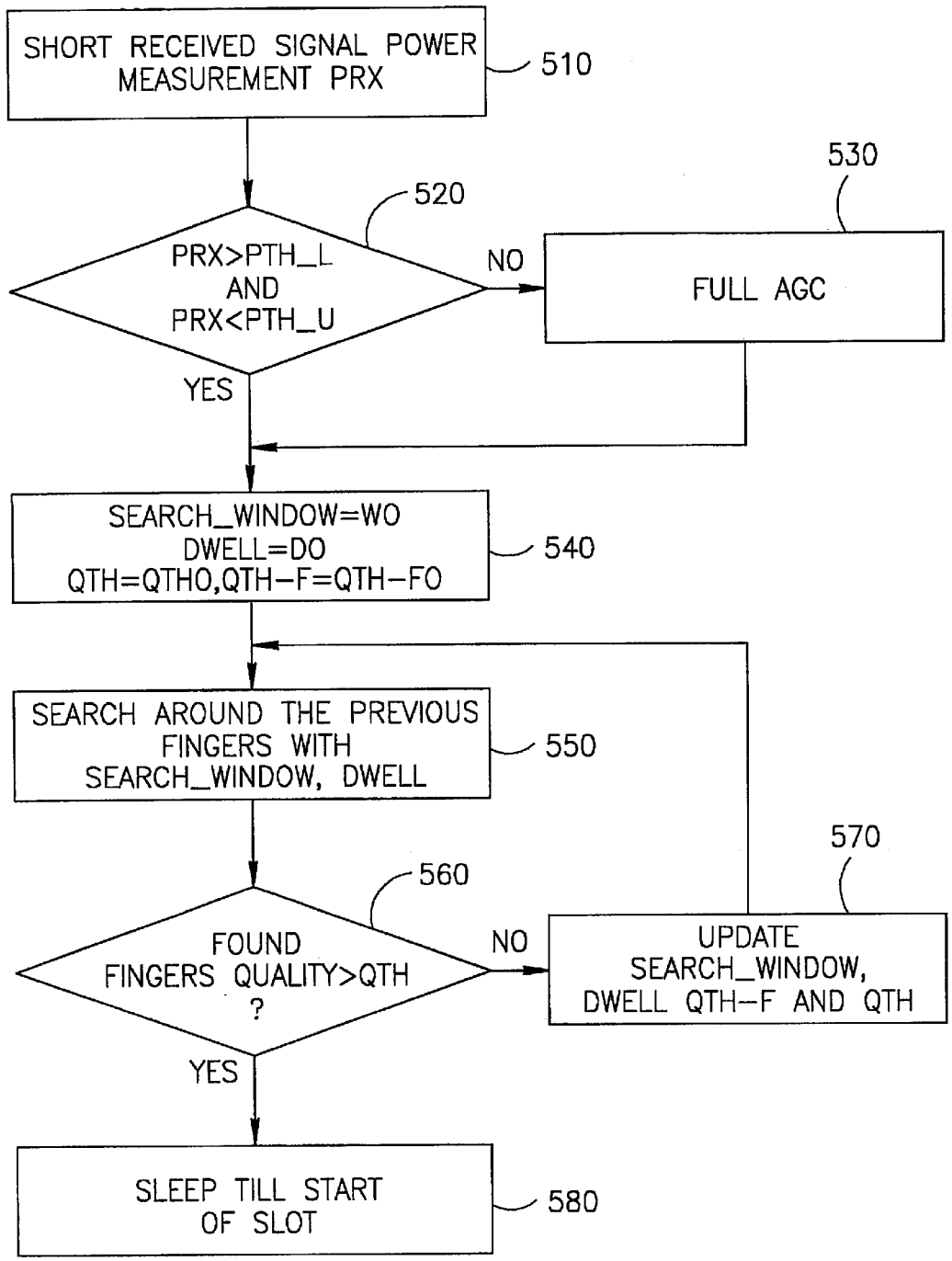
FIG. 5 is a flowchart of one embodiment of the present invention.

FIG. 5 illustrates one mode of operation as controlled by controller 140. First, a very short measurement of the received signal power is taken (block 510). If the newly measured received signal level does not differ considerably from the level for which the received AGC is tuned for (as determined by block 520), no further AGC is needed at this time (block 530). This is verified by comparing the measurement result with the window defined by the upper and lower thresholds $P_{TH\_U}$ and $P_{TH\_L}$. If this condition is not met by the measured power of the received signal being within the window, full AGC operation is performed ($T_{AGC}$) (block 530).

It will be appreciated that even if the above condition is met and no AGC is performed during the pre-conditioning interval, further AGC operation like power measurements and gain settings can be performed during the data detection time interval in order to improve the gain settings.

Afterwards, the fingers positions known from the previous slots are checked. This is done by setting a relatively short search window Wo around the fingers positions known from the previous slots, or the positions interpolated on the basis of the previously estimated fingers movements (block 540). The window Wo is searched with a time resolution of typically ½ or 1 chip where each position is checked for dwell time of Do (block 550). All the positions with quality measure that exceed the threshold Qth_fo are declared as having a useful receive path.

Various quality measures can be applied. For example: power estimation of received path:

$$Ep(i) = |R(i)|^2$$

where $$R(i) = \frac{1}{Dwell} \sum_{j=1}^{Dwell} r_j(i) \cdot S_j^*,$$

$r_j(i)$ is the de-spreader output of the $j^{th}$ symbol of the received signal of path i, $S_j$ is the transmitted $j^{th}$ symbol (known to the receiver like in IS-95 pilot channel or estimated by the receiver at other applications) and Ep(i) is the estimated power of path i.

Alternatively, the estimated signal to noise and interference (SNIR) of each path can serve as a quality measure:

$$SNIR(i) = \frac{Ep(i)}{It(i)}$$

where It(i) is the estimated averaged sum of noise and interference at path i. It(i) can be estimated by:

$$It(i) = \frac{1}{Dwell} \sum_{j=1}^{Dwell} |r_j(i) \cdot S_j^* - R(i)|^2.$$

A quality measure is then applied on the found paths. Various quality measures can be used, for example: estimated sum of powers of all found paths:

$$\sum_{i=1}^{No.\ of\ found\ paths} Ep(i),$$

estimated sum of signal to noise and interference ratios on all found paths:

$$\sum_{i=1}^{No.\ of\ found\ paths} \frac{Ep(i)}{It(i)}$$

Those skilled in the art are aware of a variety of quality measures and methods of generating them.

If this quality measure exceeds a predefined threshold (block 560), the receiver goes into a sleep mode until the slot beginning (block 580). In this sleep mode, all parts of the receiver (RF parts and baseband parts) can be turned off except those parts which are needed for waking up the receiver at the slot start (such as a low power counter). If the quality criteria are not met, the search window around each finger, the dwell time and the quality threshold are updated, and steps 550 to 570 are repeated. Obviously, all thresholds can be adaptive.

Other search methods, such as the one known as "Multiple Dwell Search", can be employed (see for example: "Multiple Dwell Serial Search: Performance and Application to Direct Sequence Code Acquisition" by David M. DiCarlo and Charles L. Weber, IEEE Transaction on Communications, VOL. COM-31, No. 5, May 1983).

Figure 6:
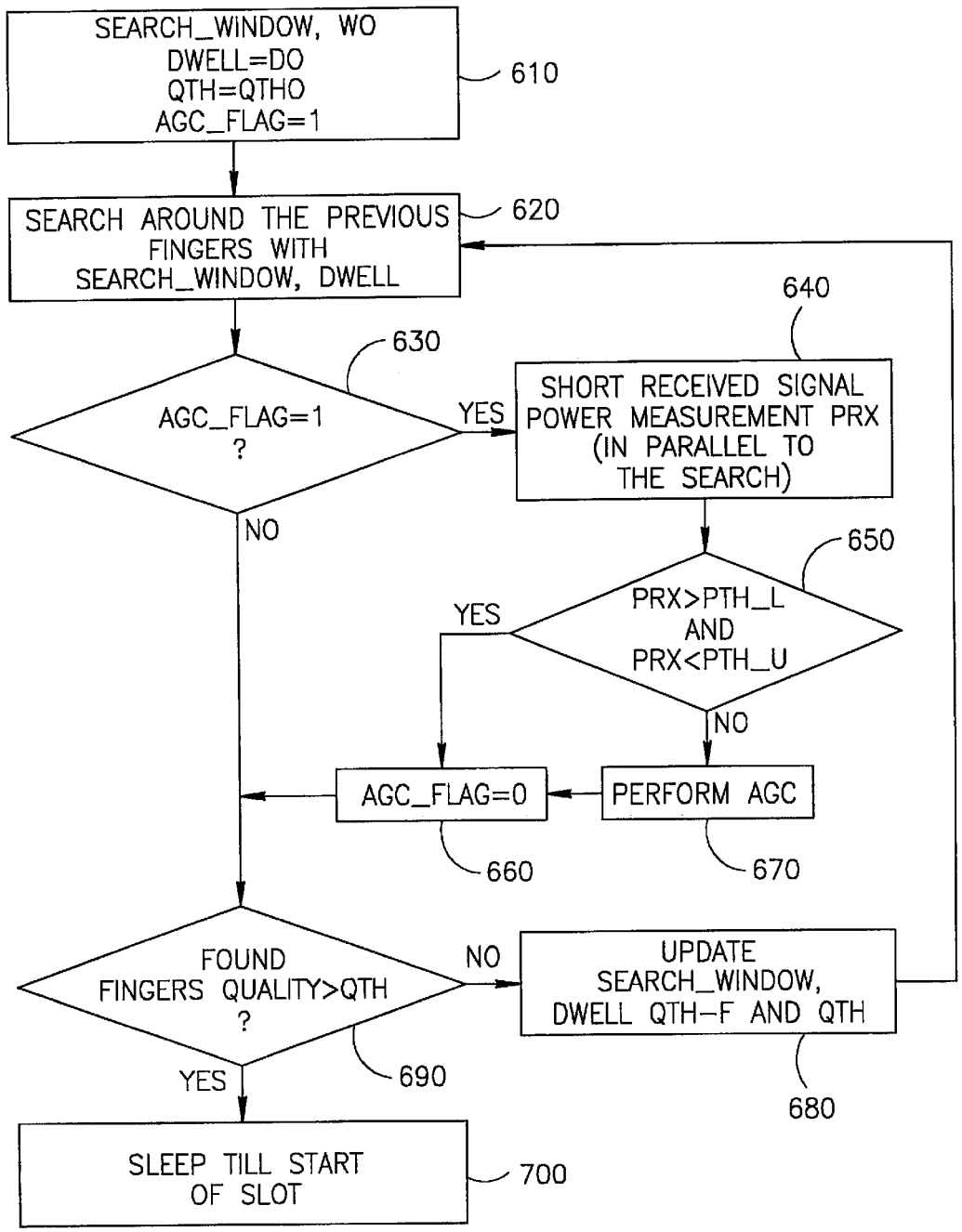
FIG. 6 is a flowchart of another embodiment of the present invention.

FIG. 6 illustrations another embodiment of the invention, wherein the received signal power measurement 640, the threshold comparison 650, and the AGC 670, are performed concurrently in parallel to the search window of steps 620, 690 and 680.

While the invention has been described with respect to preferred embodiments, it will be appreciated that these are set forth merely for purposes of example, and that many other variations, modifications and applications of the invention may be made.

What is claimed is:

1. A method comprising:

deactivating at least part of a receive path of a receiver until the start of a data-detection time interval in a frame in the event that estimated values of predetermined characteristics of a signal received by said receiver during said frame are acceptable, said predetermined characteristics affected by pre-conditioning functions performed on said receiver prior to the start of said data-detection time interval.

2. The method of claim 1, wherein said pre-conditioning functions include an automatic gain control function, and wherein said estimated values include an estimated power of said signal.

3. The method of claim 1, wherein said pre-conditioning functions include a multipath search function, and wherein said estimated values include an estimated signal-to-noise-and-interference ratio of said signal.

4. A method comprising:

during a pre-conditioning period a pre-conditioning period that is prior to the start of a data-detection time interval in a frame, estimating predetermined characteristics of a signal received by a receiver during said frame, said predetermined characteristics affected by pre-conditioning functions performed on said receiver during said pre-conditioning period; and deactivating at least part of a receive path of said receiver until the start of said data-detection time interval, thus terminating said pre-conditioning period prior to the start of said data-detection time interval, in the event that said predetermined characteristics are acceptable.

5. The method of claim 4, wherein said pre-conditioning functions include an automatic gain control function, and wherein estimating said predetermined characteristics includes at least estimating an estimated power of said signal.

6. The method of claim 4, wherein said pre-conditioning functions include a multipath search function, and wherein estimating said predetermined characteristics includes at least determining an estimated signal-to-noise-and-interference ratio of said signal.

7. A portable radio receiver comprising:

control circuitry to deactivate at least a part of a receive path of the receiver until the start of a data-detection time interval of a frame in the event that estimated values of predetermined characteristics of a signal received by said receive path during said frame are acceptable, said predetermined characteristics affected by pre-conditioning functions performed on said receiver prior to the start of said data-detection time interval.

8. The receiver of claim 7, further comprising:

pre-conditioning circuitry in said receive path to pre-condition said radio receiver using said pre-conditioning functions.

9. The receiver of claim 7, wherein said pre-conditioning functions include an automatic gain control function, and wherein said predetermined characteristics include an estimated power of said signal.

10. The receiver of claim 7, wherein said pre-conditioning functions include a multipath search function, and wherein said predetermined characteristics include an estimated signal-to-noise-and-interference ratio of said signal.

11. A portable radio receiver comprising;

data-detection circuitry in a receive path to detect data destined for a selected receiver;

pre-conditioning circuitry in said receive path to pre-condition said radio receiver using pre-conditioning functions during a pre-conditioning period; and control circuitry coupled to said data-detection circuitry and said pre-conditioning circuitry, said control circuitry to activate said receive path for said pre-conditioning period and to deactivate at least part of said receive path until the start of a data-detection time interval of a frame thus terminating said pre-conditioning period prior to said data-detection time interval in the event that estimated values of predetermined characteristics of a signal received by said receive path during said frame are acceptable, said predetermined characteristics affected by one or more of said preconditioning functions.

12. The receiver of claim 11, wherein said pre-conditioning functions include an automatic gain control function, and wherein said predetermined characteristics include an estimated power of said signal.

13. The receiver of claim 11, wherein said pre-conditioning functions include a multipath search function, and wherein said predetermined characteristics include an estimated signal-to-noise-and-interference ratio of said signal.

* * * * *